Sept. 4, 1951  J. H. SHREVE  2,566,639
CUTTING MACHINE
Filed June 5, 1946
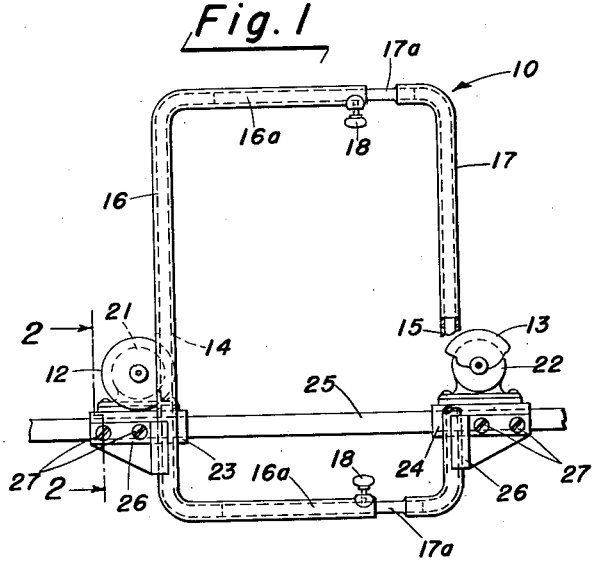
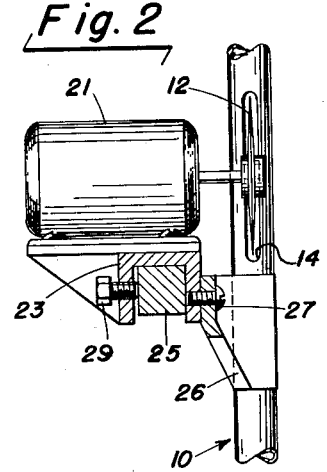
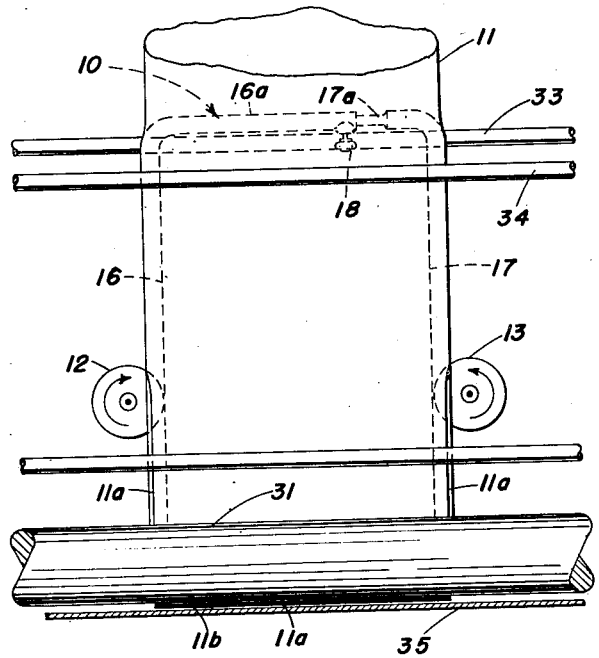
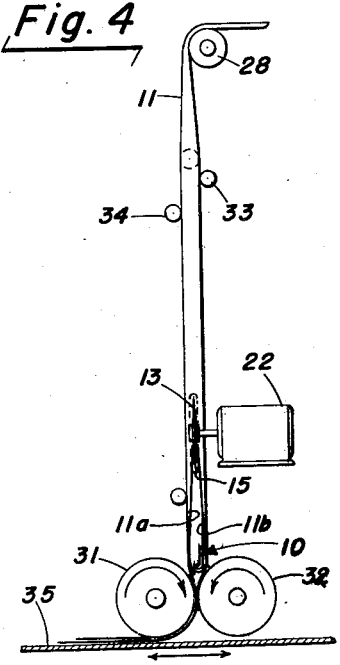
Inventor:-
James H. Shreve,
By
Pierce & Scheffler,
Attorneys.

Patented Sept. 4, 1951

2,566,639

UNITED STATES PATENT OFFICE 2,566,639

CUTTING MACHINE

James H. Shreve, Mayodan, N. C., assignor to Washington Mills Company, Winston-Salem, N. C., a corporation of North Carolina Application June 5, 1946, Serial No. 674,601

7 Claims. (Cl. 164—61)

This invention relates in general to cutting machines and in particular to machines for cutting tubular fabrics and like materials.

In the knit cloth industry, the fabric is knitted in a tubular web which is then delivered to a "laying-up" machine that stacks the cloth in flattened layers on a table as the machine is moved back and forth along the table. Previous to this invention, the flattened cloth tubes were slit along both folded edges to form two strips after it was stacked and the slitting operation was performed either by inserting a knife inside of the folded edges and running it along the tube from one end to the other, or by running a motor driven cutting knife along a stack of the tubes as close as possible to the folded edges. Either method of slitting was quite expensive. The first had to be performed by hand with an ordinary knife and therefore took considerable time; the second took less time but resulted in considerable wastage of cloth cut off at the edge portions of the flattened tube.

The object of this invention is to provide a cutting machine which will slit a cloth tube axially in such a manner that there is no wastage whatsoever. Furthermore, when the novel cutting machine hereinafter described is associated with a "laying-up" machine, the cloth is cut as it is stacked in layers and therefore eliminates the additional cutting operation heretofore necessary.

Another object is to provide a machine for slitting a flattened cloth tube longitudinally into a plurality of strips.

A specific object is to provide a machine for cutting cloth tubes comprising a spreader form over which the tube is drawn and a motor driven cutting knife that is introduced into an aperture in the form to cut through the cloth tube as the latter is drawn over the form past the knife.

Another specific object is to provide a machine for cutting flattened cloth tubes into two strips comprising a substantially rectangular frame over which the cloth tube is pulled, opposite sides of the frame being provided with slots within which motor driven cutting means are introduced to slit the tube as the latter moves past the cutting means.

Yet another object is to provide a machine for slitting cloth tubes which comprises a form over which the tube is pulled, the form being provided with oppositely disposed openings within each of which a motor driven cutter is operated that slits the tube into two sheets as the tube is pulled past the cutters.

Still another object is to provide a cloth cutting machine comprising a spreader form over which the cloth tube is stretched and including cutting means associated with slots in the frame to slit the fabric, the frame and cutting means being adjustable to accommodate cloth tubes of different sizes.

These and other objects and advantages of the invention will become more apparent from the following detailed description when considered with the accompanying drawings which illustrate a preferred construction.

In the drawings, Fig. 1 is a front elevation of the cloth frame and cutting knives, with part of the latter broken away;

Fig. 2 is a somewhat enlarged transverse view on lines 2—2 of Fig. 1; and Figs. 3 and 4 are front and side views, respectively, showing the manner in which the cloth tube is cut as it is fed through past the knives.

Referring now to the drawings, the principal components of the improved cutting machine include a substantially rectangular frame 10 made from tubular material over which the flattened knitted cloth tube 11 is pulled and motor driven cutting knives 12, 13 which operate respectively in slots 14, 15 provided in the frame at each side.

The frame 10 is comprised of a pair of U-shaped tubular members 16, 17, the legs 16a, 17a of which are telescoped into each other so as to permit the width of the frame to be adjusted as necessary to accommodate different widths of the cloth tube 11. Set screws 18 at the top and bottom of the frame thread into the inner side of frame legs 16a and engage the surface of legs 17a to lock the frame at a desired width.

Each of the U frame members 16, 17 is split for a short distance along the side to provide the slots 14, 15 previously referred to, and the knives 12, 13, which preferably have a rotary motion are driven by motors 21, 22. The motors are carried by channeled supports 23, 24 which rest upon a transversely extending support bar 25.

The frame 10 is preferably supported in an upright position at each side by means of off-set brackets 26, one end of each of these brackets being secured to the outer side of frame members 16, 17 while the other end of each is fastened by screws 27 to the motor supports 23, 24, respectively. Each of the motor supports may be locked in position on the bar 25 by means of set screws 29 and hence frame 10 may be adjusted accordingly to various widths by moving either or both of the motor supports transversely along bar 25.

A guide roller 28 above the top of frame 10 and a pair of power driven and oppositely rotating feed rolls 31, 32 beneath the bottom of the frame are provided to pull the flattened cloth tube 11 downwardly over the frame past the cutting knives. Transversely extending bars 33, 34 on opposite sides of the cloth tube adjacent the frame may be provided as additional guiding means for the tube.

As shown in the drawings, the frame 10 should always be adjusted so that it will be slightly wider than the woven width of the flattened cloth tube 11 in order that the latter will be somewhat stretched or spread as it is pulled downwardly over the frame to make it uniform in width as it is cut.

The guide roller 28, the feed rolls 31, 32 and the guide bars 33, 34 are parts of the "laying-up machine," the remainder of which has purposely not been illustrated in order to simplify the drawings and also to limit them to the invention which relates to the cutting device.

In starting the cutting operation, the open end of the cloth tube is pulled down over the sides of the frame 10 and then slit back along both sides for a distance sufficient to permit the two cloth sheets 11a, 11b, to be introduced between the feed rolls 31, 32. The motors 21, 22 driving the cutting knives, and the feed rolls 31, 32 are then started and the cloth tube will then be cut into the two sheets 11a, 11b of like width as it is pulled downwardly on the frame by the rolls. As the two sheets 11a, 11b pass outwardly from the feed rolls, the whole laying-up machine is pushed back and forth along table 35 in the direction of the arrows to stack the sheets in layers.

In conclusion it is to be understood that while I have described and illustrated a preferred embodiment of the invention, various changes in the construction and arrangement of parts may be made without departing from the spirit and scope of the invention as defined in the appended claims.

Having thus fully described and illustrated this invention, I claim:

1. A machine for cutting a cloth tube and the like into sheet material comprising a stationary bar type cloth spreader frame constituted by a pair of U members, the legs of which are adjustably telescoped to vary the width of the frame and over which said tube is adapted to be pulled in flattened form, said frame being slotted along both sides in a direction longitudinally of the tube, and motorized knife means positioned outwardly of said frame to work in the slotted portions thereof.

2. A machine for cutting cloth tubes and the like into a pair of strips comprising a stationary spreader frame constituted by a pair of U members, the legs of which are telescoped and over which said tube is adapted to be pulled, said frame being recessed along opposite sides thereof, and a pair of motor driven knives supported to work respectively in the recessed portions of said frame.

3. A cutting machine as defined in claim 2 wherein at least one side of said frame and its associated knife are adjustable transversely to accommodate tubes of different widths.

4. A machine for cutting a cloth tube and the like into a pair of strips comprising; a stationary tube spreader frame over which said tube is adapted to be drawn, said frame being constituted by a pair of juxtaposed U-shaped members the legs of which are adjustably connected and the sides of which are recessed, a pair of motors each driving a rotary knife adapted to work respectively in the recessed portions of said frame, a support disposed transversely of said frame, and means mounting at least one of said U frame members and the motorized knife associated therewith on said support, said mounting means being adjustable along said support to vary the width of said frame.

5. A cutting machine as defined in claim 4 wherein the leg portions of said U frame members are telescoped to provide the adjustable connection therebetween.

6. A machine for cutting cloth tubes and the like into two sheets of equal width comprising a tube spreader frame constituted by a pair of elongated members spaced apart and over which the tube is adapted to be pulled, each said member being slotted longitudinally along its outer side, a motorized knife individual to each of said members and adapted to work in the slot therein, a common support for each member and its associated knife, and a bar extending transversely of said members on which said supports are mounted, at least one of said supports being adjustable along said bar to vary the width of the frame.

7. A machine adaptable for slitting cloth tubes of various sizes and the like into two strips of equal width comprising a stationary tube spreader frame constituted by a pair of parallel spaced elongated frame members adapted to enter and spread the section of the tube in contact therewith as said tube is pulled past said frame over and in contact with opposite outer sides of said frame members, said frame members being provided with a pair of elongated slots parallel with the frame and extending inwardly from said opposite outer sides thereof, a motorized knife individual to each of said frame members and adapted to work in the associated slot, a common support for each frame member and its associated knife, and means for adjusting the spacing between said supports to thereby effect a corresponding adjustment in the width of said frame.

JAMES H. SHREVE.

REFERENCES CITED

The following references are of record in the file of this patent:

UNITED STATES PATENTS

| Number | Name | Date |
|---|---|---|
| 1,298,005 | Chatfield | Mar. 25, 1919 |
| 1,379,597 | Trogner | May 25, 1921 |
| 1,628,215 | Zoline | May 10, 1927 |
| 1,801,757 | Shippling | Apr. 21, 1931 |
| 1,925,841 | Matthews | Sept. 5, 1933 |
| 2,305,997 | Shields | Dec. 22, 1942 |